Patented Jan. 27, 1942

2,271,210

UNITED STATES PATENT OFFICE 2,271,210

METHOD OF JOINING METALLIC MEMBERS AND JOINT THEREBY PRODUCED

Marvin R. Scott, Elizabeth, N. J., assignor to The Linde Air Products Company, a corporation of Ohio No Drawing. Application December 3, 1938, Serial No. 243,779

5 Claims. (Cl. 113—112)

This invention relates to the joining of metal members and refers more particularly to a method of joining zinc-coated iron members, and to joints thereby produced.

Iron and steel are frequently coated with a layer of zinc to protect them from the corrosive action of the atmosphere, of water, and of other relatively mild corrosives, the zinc coating usually being applied by one of several well known processes, such as galvanizing, sherardizing, electro-plating, or spraying. The corrosion-resistance of zinc-coated iron is dependent on the presence of an unbroken coating of zinc, and the production of strong, corrosion-resistant joints in such material is made difficult because of this fact and the fact that the temperatures required for ordinary welding and brazing operations are so high as to destroy the zinc layer and the corrosion-resistance of the member over a considerable area adjacent the weld. The temperatures used for soft soldering are not so high; but soft soldered joints are not very strong.

There is accordingly a demand for a method of joining zinc-coated iron members which will produce a strong, corrosion-resistant joint, and it is an object of the invention to provide such a method and joint.

The invention is based on the discovery that zinc-coated iron may readily be joined with aluminum, or an aluminum base alloy, and that joints so formed are strong and have good resistance to corrosion.

The method of forming a joint in zinc-coated iron according to the invention is similar in principle to a brazing operation and in practice to the customary method of welding aluminum. Thus, as in brazing, the base metal is not melted, but is heated to a temperature sufficient only to insure the formation of a good bond. The edges to be joined are thoroughly cleaned and preferably painted with a mixture of equal parts water and flux of the type generally used in the welding of aluminum. Suitable fluxes include those containing halides of the alkali metals as major components.

An aluminum base welding rod containing about 5% silicon and copper in small amounts up to about 6% and having a melting point between 1100° F. and 1200° F. is a suitable source of filler metal. The filler rod is preferably melted by the heat of a neutral oxy-acetylene flame so that excessive oxidation will not occur, and care is taken to direct the heat mainly at the filler rod so that the zinc coating will not be volatilized. Wherever convenient, it is preferred to apply filler material to the under side of the joint, for reinforcement, although such procedure is not essential.

The method of the invention is quite simple, the joints are strong, and the corrosion-resistance of the zinc-coated iron adjacent the joint is not destroyed. Further, the deposited metal is resistant to corrosion of the type to which zinc-coated iron is ordinarily subjected.

The invention is not limted to or by the examples discussed but is susceptible of modification. For example, any aluminum base material having a melting point below about 1200° F. may be used as filler metal, and other changes may be made in the described procedure without departing from the invention.

I claim:

1. Method of forming a strong, corrosion-resistant joint in zinc-coated iron, which comprises bonding at least two adjacent surfaces of such zinc-coated iron with a fusion deposited aluminum base alloy having a melting point below about 1200° F., whereby the zinc coating in the vicinity of the joint so formed is substantially unimpaired.

2. Method of forming a strong, corrosion-resistant joint in zinc-coated iron, which comprises bonding at least two adjacent surfaces of such zinc-coated iron with a fusion deposited aluminum base alloy having a melting point between about 1100° F. and about 1200° F., whereby the zinc coating in the vicinity of the joint so formed is substantially unimpaired.

3. Joint comprising at least two adjacent zinc-coated iron members having an unbroken zinc coating, said members being bonded by a fusion deposited aluminum base alloy having a melting point below about 1200° F.

4. Joint comprising at least two adjacent zinc-coated iron members having an unbroken zinc coating, said members being bonded by a fusion deposited aluminum base alloy having a melting point between about 1100° F. and about 1200° F.

5. Method of forming a strong corrosion resistant joint between zinc-coated iron members which comprises melting in a neutral oxy-acetylene flame an aluminum base alloy having a melting point between about 1100° F. and about 1200° F. and depositing the molten alloy on adjacent parts of said members, the temperature of said members being maintained well below the boiling point of zinc, whereby the zinc coating is substantially unimpaired.

MARVIN R. SCOTT.